United States Patent
Loh et al.

(10) Patent No.: US 10,158,712 B2
(45) Date of Patent: Dec. 18, 2018

(54) SOURCE-SIDE RESOURCE REQUEST NETWORK ADMISSION CONTROL

(71) Applicant: Advanced Micro Devices, Inc., Sunnyvale, CA (US)

(72) Inventors: Gabriel H. Loh, Bellevue, WA (US); Eric Christopher Morton, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 584 days.

(21) Appl. No.: 14/730,837

(22) Filed: Jun. 4, 2015

(65) Prior Publication Data
US 2016/0359973 A1    Dec. 8, 2016

(51) Int. Cl.
| | | |
|---|---|---|
| G06F 15/16 | (2006.01) | |
| H04L 29/08 | (2006.01) | |
| G06F 3/06 | (2006.01) | |

(52) U.S. Cl.
CPC ........ H04L 67/1097 (2013.01); G06F 3/0604 (2013.01); G06F 3/067 (2013.01); G06F 3/0655 (2013.01)

(58) Field of Classification Search
CPC ...... G06F 3/0604; G06F 3/0655; G06F 3/067; H04L 67/1097
USPC ................................................. 711/154, 158
See application file for complete search history.

(56) References Cited

U.S. PATENT DOCUMENTS

| | | | |
|---|---|---|---|
| 7,380,035 B1 * | 5/2008 | Donlin ............. | H03K 19/17732 710/116 |
| 2006/0123169 A1 * | 6/2006 | Chai ..................... | G06F 13/161 710/116 |
| 2006/0265552 A1 * | 11/2006 | Davis .................. | G06F 12/0862 711/137 |
| 2013/0086337 A1 * | 4/2013 | Habeck ................. | G06F 11/073 711/156 |

(Continued)

OTHER PUBLICATIONS

Chang et al. HAT: Heterogeneous Adaptive Throttling for On-Chip Networks. 2012 CMU.*

(Continued)

*Primary Examiner* — Bryan Lee
(74) *Attorney, Agent, or Firm* — Zagorin Cave LLP

(57) ABSTRACT

A technique for source-side memory request network admission control includes adjusting, by a first node, a rate of injection of memory requests by the first node into a network coupled to a memory system. The adjusting is based on an injection policy for the first node and memory request efficiency indicators. The method may include injecting memory requests by the first node into the network coupled to the memory system. The injecting has the rate of injection. The technique includes adjusting the rate of injection by the first node. The first node adjusts the rate of injection according to an injection policy for the first node and memory request efficiency indicators. The injection policy may be based on an injection rate limit for the first node. The injection policy for the first node may be based on an injection rate limit per memory channel for the first node. The technique may include determining the memory request efficiency indicators based on comparisons of target addresses of the memory requests to addresses of recent memory requests of the first node.

15 Claims, 5 Drawing Sheets

(56) References Cited

U.S. PATENT DOCUMENTS

| | | | | |
|---|---|---|---|---|
| 2013/0326158 A1* | 12/2013 | Chen | ................. | G06F 12/0607 |
| | | | | 711/148 |
| 2014/0052938 A1* | 2/2014 | Kim | ...................... | G06F 12/00 |
| | | | | 711/154 |
| 2015/0293709 A1* | 10/2015 | Quach | ................ | G06F 13/1605 |
| | | | | 711/105 |

OTHER PUBLICATIONS

Das. Application-Aware Prioritization Mechanisms for On-Chip Networks. Micro 2009. ACM 2009.*

Ebrhimi et al. Fairness via Source Throttling: A Configurable and High-Performance Fairness Substrate for Multi-Core Memory Systems. ACM 2010.*

* cited by examiner

SOURCE-SIDE RESOURCE REQUEST NETWORK ADMISSION CONTROL

BACKGROUND

Field of the Invention

The present invention is related to computing systems and more particularly to computing systems including multiple requestors for a shared resource.

Description of the Related Art

In general, in computing systems that include multiple nodes (e.g., central processing unit (CPU), processor, graphics processing unit (GPU), coprocessor, Input/Output node, or other node) and a shared resource (e.g., memory system), when sending requests from an individual node to the shared resource, the requests must often be first routed through a network (e.g., a network-on-a-chip (NoC)). Memory requests that target the same page or row of a memory system (e.g., dynamic random access memory (DRAM)) during a period of time may be serviced more efficiently by the memory subsystem due to a reduced number of bank activation and precharge commands needed to service such memory requests, which result in page or row buffer hits, respectively. However, typical mechanisms for injecting memory requests into the network tend to be conservative. For example, a node may assume that each memory request will induce a bank conflict and may allocate bandwidth and adjust injection rates accordingly. Although those mechanisms may maintain quality-of-service constraints, such conservative injection policies may substantially underutilize the network and available memory bandwidth. Accordingly, improved techniques for injecting resource requests into a network are desired.

SUMMARY OF EMBODIMENTS OF THE INVENTION

A method includes adjusting, by a first node, a rate of injection of memory requests by the first node into a network coupled to a memory system. The adjusting is based on an injection policy for the first node and memory request efficiency indicators. The method may include injecting memory requests by the first node into the network coupled to the memory system. The injecting has the rate of injection. The injection policy may be based on an injection rate limit for the first node. The injection policy for the first node may be based on an injection rate limit per memory channel for the first node. The method may include determining the memory request efficiency indicators based on comparisons of target addresses of the memory requests to target addresses of recent memory requests of the first node. The method may include determining the memory request efficiency indicators based on comparisons of corresponding memory request types to request types of recent memory requests of the first node. The memory request efficiency indicators may be further based on comparisons of time stamps associated with the recent memory requests to corresponding current times. The adjusting may include determining a metric for memory requests injected into the network by the first node and comparing the metric to an injection rate limit for the first node. The metric may be increased by a first amount for a first memory request of a plurality of efficient memory requests injected into the network by the first node, increased by a second amount less than the first amount for each other memory request of the plurality of efficient memory requests injected into the network by the first node, and increased by a third amount for each memory request of a plurality of inefficient memory requests injected into the network by the first node. The method may include dynamically adjusting at least one of the first amount, the second amount, and the third amount according to at least one of an actual efficiency indicator for the plurality of efficient memory requests and an actual efficiency indicator for the plurality of inefficient memory requests.

In at least one embodiment of the invention, an apparatus includes a node comprising a processor and a network interface. The network interface is configured to inject memory requests into a network at an injection rate and is configured to adjust the injection rate according to an injection policy for the node and memory request efficiency indicators. The network interface may include network interface logic and a first plurality of storage elements configured to store target addresses of recently-injected memory requests recently injected into the network by the node. The network interface logic may be configured to adjust the injection rate based on comparisons of target addresses of the memory requests to target addresses stored in the first plurality of storage elements. The network interface may include a second plurality of storage elements configured to store timestamp information corresponding to the recently-injected memory requests. The network interface logic may be further configured to adjust the injection rate based on comparisons of a current time indicator to timestamp information stored in the second plurality of storage elements. The network interface logic further comprises a second plurality of storage elements configured to store an indicator of memory access type corresponding to the recently-injected memory requests. The network interface logic may be further configured to adjust the injection rate based on comparisons of access type indicators of the memory requests to memory access type information stored in the second plurality of storage elements. The network interface logic may further include a bandwidth allocation indicator indicating a relationship between bandwidth of a port of the node and a bandwidth of a channel of a memory system shared by the node with other nodes of the network. The network interface logic may be further configured to determine the injection rate based on the bandwidth allocation indicator.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

Figure 1:
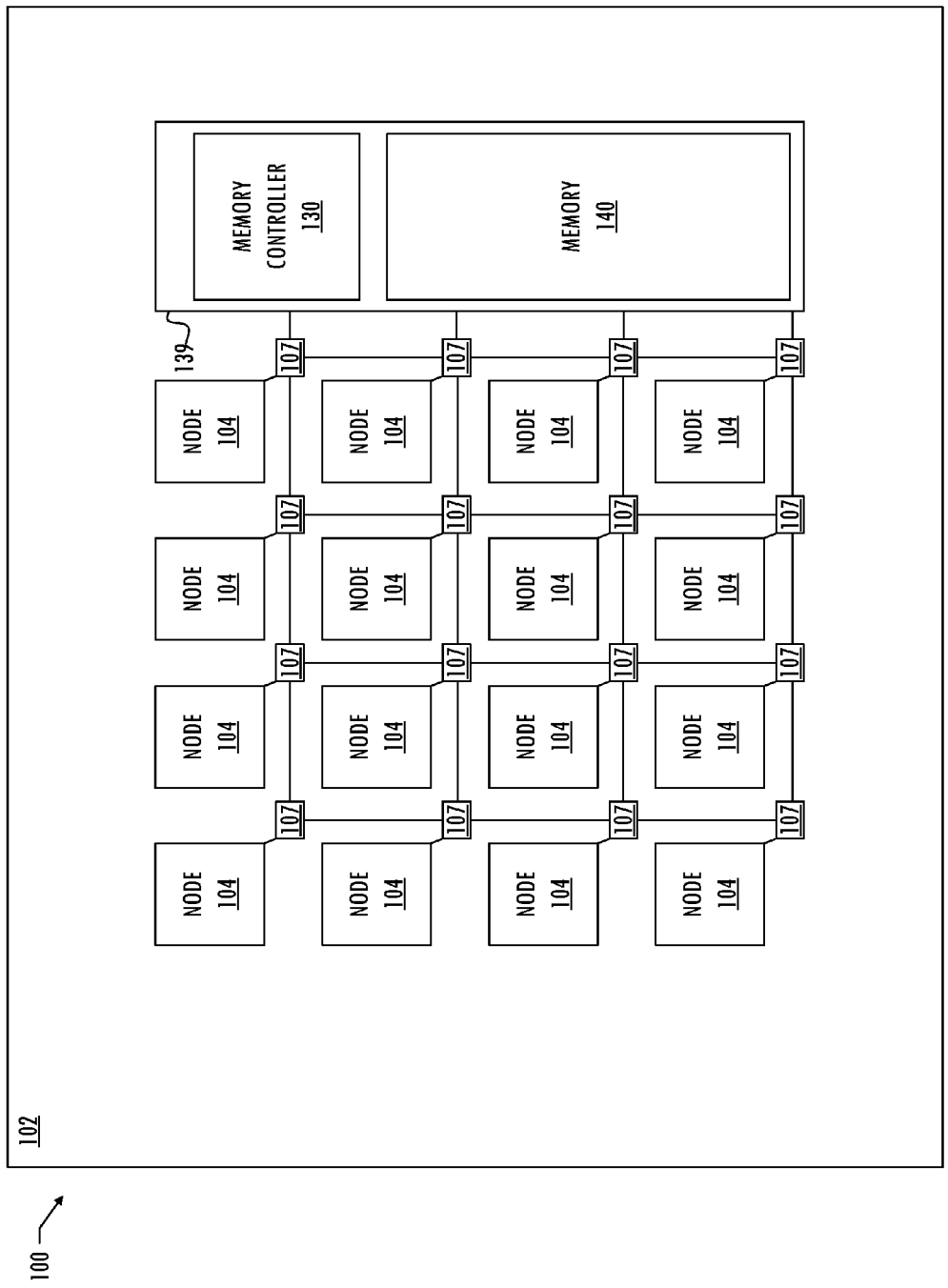
FIG. 1 illustrates a functional block diagram of an exemplary network-on-a-chip system.

Referring to FIG. 1, in at least one embodiment, a network or communication subsystem using on-chip interconnects implements a network-on-a-chip (NoC 126) to connect multiple nodes 104 together in a system-on-a-chip (SoC). Each node 104 may be a processor, a central processing unit (CPU), a CPU cluster, a graphics processing unit (GPU), a GPU cluster, an input/output unit, a memory controller, a coprocessor, or other processing unit, any of which may be a semiconductor intellectual property (IP) core (i.e., IP core or IP block).

As different nodes communicate with each other, traffic (e.g., requests in the form of packets, which may be partitioned into sub-packet parcels called flits) is injected into the network. The network may include a switched fabric of network nodes interconnected via one or more networking switches, (e.g., crossbar switches). HyperTransport (or Lightning Data Transport) is a packet-based system bus architecture. An exemplary fabric is described in U.S. patent application Ser. No. 10/396,667 entitled "Computing System Fabric and Routing Configuration and Description," filed Mar. 25, 2003, naming Brian D. Willoughby and Michael V. Mattress as inventors, now U.S. Pat. No. 8,805,981, issued Aug. 12, 2014, which application is hereby incorporated by reference herein. However, note that other embodiments of a network include conventional network switches, buses, and/or crossbar interconnections.

The network includes networking devices 107 that forward the packets or flits to other networking devices associated with corresponding nodes 104, until finally the packets or flits arrive at a destination node (e.g., another node 104 or memory system 139) where packets or flits are ejected from the network to the destination node. Networking devices 107 may be switches or routers, or other suitable networking device. Although networking devices 107 are illustrated as being external to nodes 104, networking devices 107 may be integrated with corresponding nodes 104. A typical destination node of the network is memory system 139.

Figure 2:
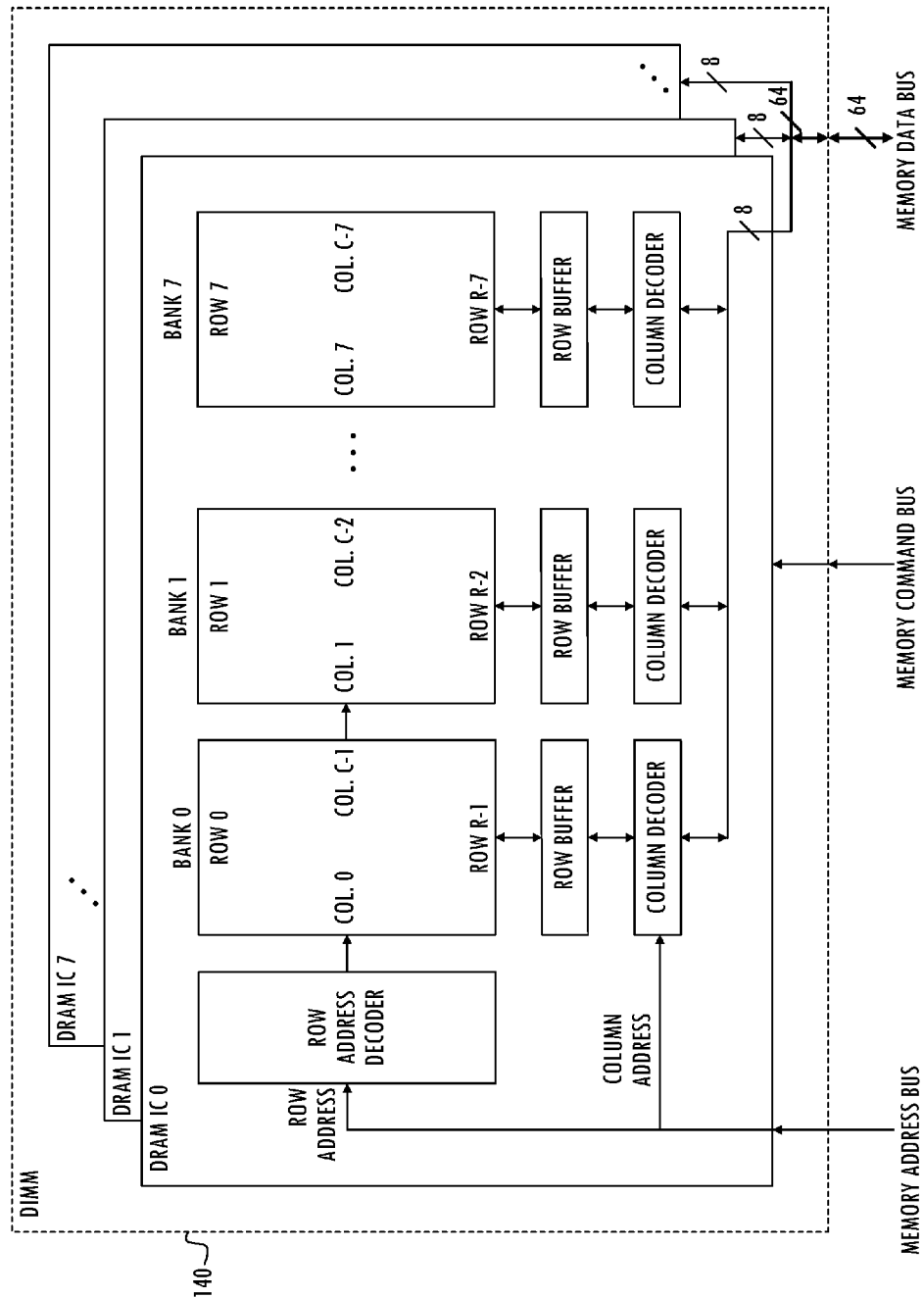
FIG. 2 illustrates a functional block diagram of an exemplary memory module.

Referring to FIG. 2, in at least one embodiment, an exemplary memory 140 includes one or more memory integrated circuits (e.g., one or more DRAM integrated circuits). The memory system may include multiple memory integrated circuits, which are accessed in parallel (e.g., configured as a dual in-line memory module, i.e., DIMM). Each memory integrated circuit includes a data interface (e.g., 8-bit data interface) that is combined with data interfaces of other memory integrated circuits to form a wider data interface (e.g., 64-bit data interface). Each memory integrated circuit may include multiple independent memory banks, which can be accessed in parallel. In at least one embodiment of the memory system, each memory bank includes a two-dimensional array of DRAM cells, including multiple rows and columns. A location of the memory is accessed using a memory address including bank, row, and column fields. Only one row in a bank can be accessed at a time and the row data is stored in a row buffer dedicated to that bank. An activate command moves a row of data from the memory array into the row buffer. Once a row is in the row buffer, a read or write command can read/write data from/to the associated memory address. Thus, the latency of a memory command depends on whether a corresponding row is in a row buffer of an associated memory bank.

If the contents of a memory address are in the row buffer (i.e., the memory address hits the row buffer), then the associated memory controller only needs to issue a read or write command to the memory bank, which has a memory access latency of $t_{CL}$ or $t_{WL}$, respectively. If the contents of the memory address are not present in the row buffer (i.e., the memory address misses the row buffer), then the memory controller needs to precharge the row buffer, issue an activate command to move a row of data into the row buffer, and then issue a read or write command to the memory bank, which has an associated memory access latency of $t_{RCD}+t_{CL}+t_{RP}$ or $t_{RCD}+t_{WL}+t_{RP}$, respectively. Note that the memory architecture of FIG. 2 is exemplary only and the teachings described herein apply to systems including other memory architectures having the same or other memory access latency and efficiency issues.

Figure 3:
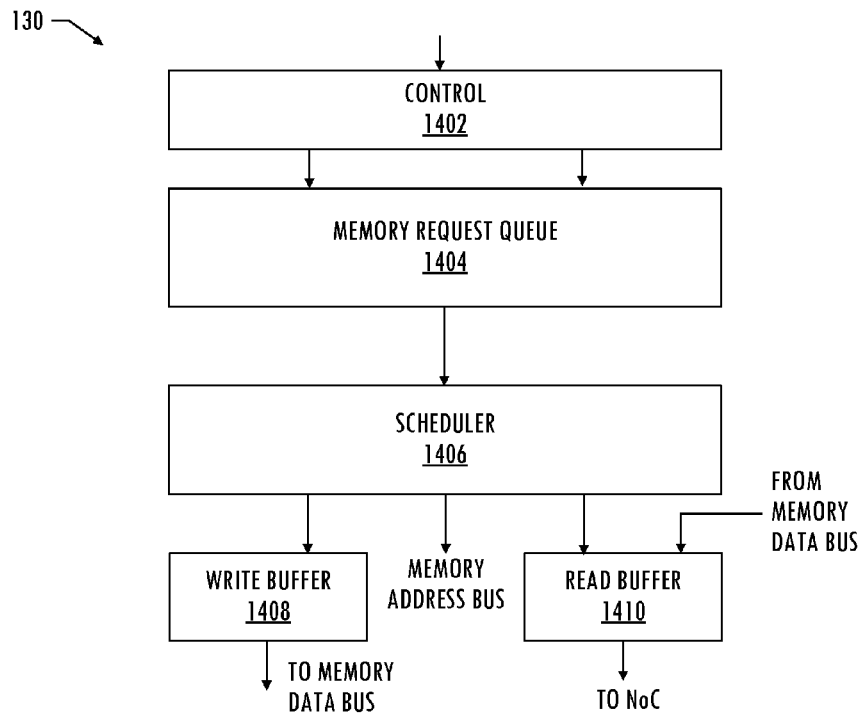
FIG. 3 illustrates a functional block diagram of an exemplary memory controller.

Referring to FIG. 3, in at least one embodiment, memory controller 130 services only one memory bank. In other embodiments, multiple memory banks are included and scheduler 1406 includes multiple separate bank schedulers for corresponding memory banks. Scheduler 1406 may be any one of a bank scheduler, a channel scheduler, a scheduler of a memory controller servicing only one memory bank, or other suitable memory request scheduler. In at least one embodiment, memory controller 130 receives memory requests from node 104. Control circuit 1402 assigns an arrival time to each memory request and stores the arrival time with the memory request (e.g., request type and request identifier) in memory request queue 1404. Scheduler 1406 prioritizes the memory requests and schedules the memory requests by reordering the memory requests into one or more sequences of memory commands based on the priorities. Scheduler 1406 sequentially executes the memory commands via a memory address bus and a memory data bus.

The amount of time that it takes memory system 139 to service a memory request depends on several factors, e.g., other outstanding requests queued in the memory system, bank conflicts, row buffer locality of the requests, whether the memory is busy performing a refresh operation, the order of operations issued to different memory ranks on the same channel, the number of recent activations issued to a rank (e.g., double data rate type three (DDR3) synchronous dynamic random-access memory (SDRAM) has a timing constraint that limits the maximum number of row activations to at most four during a specified time interval), and a large number of additional memory timing parameters/constraints. For example, a group of requests having high row buffer locality has a relatively low collective service time since those requests may be quickly serviced back-to-back without requiring costly and slow precharging and activation of multiple DRAM rows. If the memory system service time becomes too long (e.g., due to a large number of requests with poor row buffer locality), then the buffers or queues in the memory system may fill to capacity. That situation can result in back-pressure into the network, which greatly reduces the throughput of the network. Current schemes for a requesting node to inject memory requests into a network do not differentiate between requests that are likely to be serviced more efficiently (e.g., those with buffer locality causing row buffer hits, read requests followed by read requests, write requests followed by write requests, requests to independent channels) than those that are less efficient than others (e.g., those without buffer locality and those inducing bank conflicts, read requests followed by write requests to the same channel, write requests followed by read requests to the same channel). Therefore the requesting node will either be conservative (e.g., assume row buffer misses), which may result in underutilization of the network and the memory system, or the requesting node will be aggressive (e.g., assume row buffer hits), which may result in significant congestion and delays in the network and memory system when the requests actually do not realize any efficiencies. Although nodes with known access patterns (e.g., GPUs) may assume that some requests will be efficient (e.g., GPU requests tend to be well-organized for maximizing memory bandwidth), other nodes may not have known access patterns.

A source-side memory request injection technique estimates efficiencies (e.g., whether a particular memory request will result in a row-buffer hit) for a group of memory requests from a source (e.g., a node) before injecting those memory requests into the network. The technique adjusts an injection rate for memory requests by the node based on those efficiency estimates. In at least one embodiment, the source-side memory request injection technique that reduces or eliminates catastrophic traffic jams in the network includes a requesting node limiting its memory request injection rate so that the node consumes, at most, a predetermined amount of network bandwidth and memory system bandwidth, and therefore, induces only a bounded amount of load on the network. At the point of injection into the network, if the source node determines that the memory requests will be efficient (e.g., will result in row buffer hits) or determines that the memory requests will be inefficient (e.g., will cause bank conflicts), then the node injection rate can be adjusted accordingly. The technique includes a network interface that estimates whether memory requests will be efficient or not with respect to memory system performance. The network interface controls admission of the memory requests into the network based on the estimated memory request efficiency to adjust the memory request injection rate. In addition, the network interface may adjust the injection rate on actual memory request efficiencies.

The source-side memory request injection technique estimates efficiencies (e.g., whether a particular memory request will result in a row-buffer hit) for a group of memory requests queued in the source before injecting those memory requests into the network. The technique adjusts the injection rate based on the efficiency estimates. If particular memory requests are estimated to be nominally efficient or inefficient, then the source injects those memory requests into the network at a lower rate that those memory request that are estimated to be efficient. If the efficiency estimate indicates that the memory requests are efficient (e.g. those memory requests will result in row-buffer hits), then those memory requests will be injected at a higher rate than those memory requests estimated to be nominally efficient or inefficient, and/or in quick succession, since they are likely to be more efficient upon arriving at the memory system. By communicating those memory requests through the network quickly, the likelihood increases that they all arrive at the memory system within a period of time that allows the memory controller of the memory system to schedule the servicing of those requests to achieve the estimated efficiency (e.g., row buffer hits). The source-side memory request network injection technique described below may dynamically estimate a memory request stream efficiency for those nodes without known access patterns, and may also detect when a typically efficient node is actually not efficient (i.e., is nominally efficient or inefficient).

Figure 5:
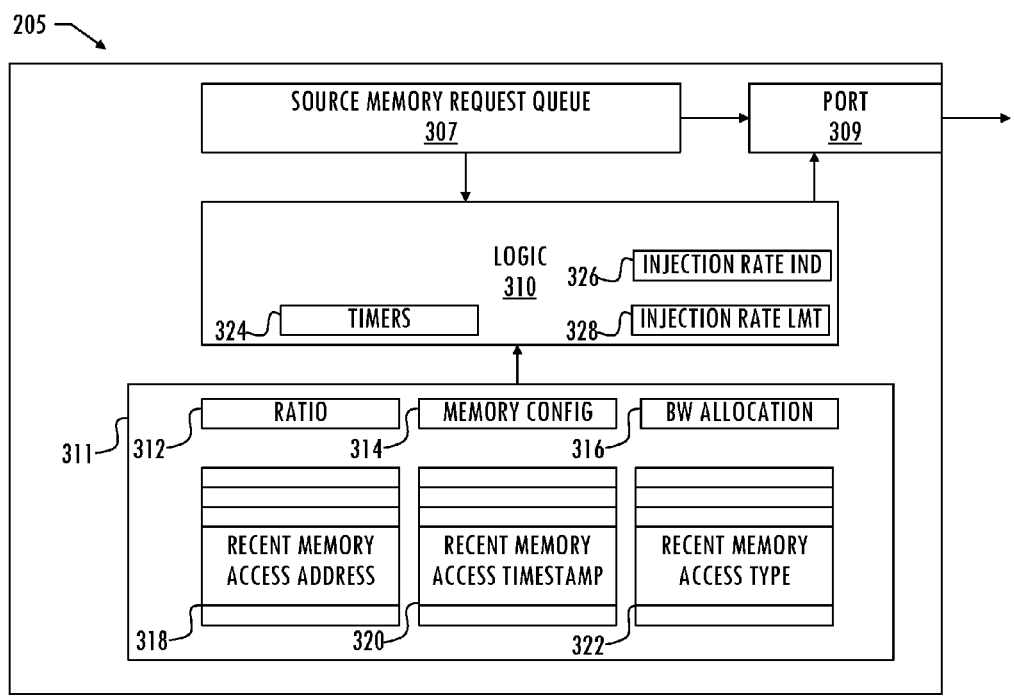
FIG. 5 illustrates a functional block diagram of a network interface consistent with at least one embodiment of the invention.
Figure 4:
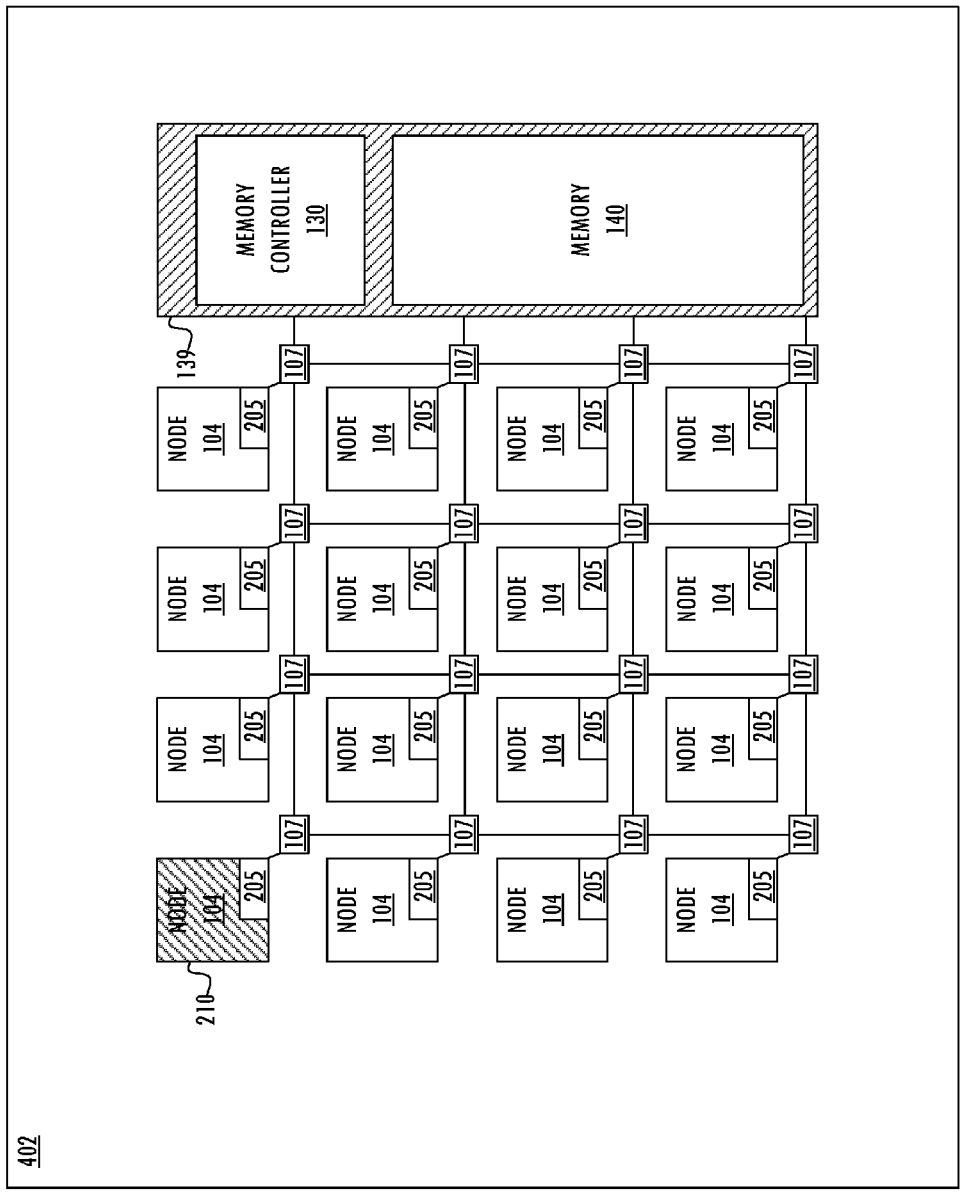
FIG. 4 illustrates a functional block diagram of a network-on-a-chip system consistent with at least one embodiment of the invention.

Referring to FIGS. 4 and 5, in at least one embodiment of NoC 402, each node 104 is coupled to the network by a corresponding network interface 205. Each network interface 205 stores configuration information and runtime data in storage 311. Logic 310 bases memory request injection decisions on information stored in storage 311. In at least one embodiment, logic 310 compares the physical address fields of each pending memory request (e.g., those memory requests awaiting injection into the network in source memory request queue 307) at the point of memory request injection into the network (e.g., port 309). Network interface 205 includes ratio storage element 312, memory configuration storage element 314, and bandwidth allocation storage element 316. Memory configuration storage element 314 includes information about the target memory system 139 of FIG. 4. For example, that information may indicate how physical addresses of memory system 104 are interleaved across channels, ranks, and banks of the memory system according to how much memory is in the system, Basic Input/Output System (BIOS) settings, etc. In at least one embodiment, memory configuration storage element 314 indicates that contiguous, aligned blocks of 512 bytes are mapped to the same memory bank of memory 140. Bandwidth allocation storage element 316 stores information indicating the amount of bandwidth allocated to the particular node 104 of NoC 402. Ratio storage element 312 stores information indicating a discount rate for efficient memory requests described further below.

In addition to the information that may be predetermined and/or may be updated dynamically, network interface 205 includes storage elements for storing a history of run-time information for the node, e.g., recent memory access addresses storage elements 318, recent memory access timestamp storage elements 320, and recent memory access type storage elements 322. Those storage elements store data corresponding to memory requests recently injected into the network by the node. Recent memory access addresses storage elements 318 may store entire addresses or only relevant portions of addresses. Recent memory access type storage elements 322 may store an indication of whether a corresponding memory request is a read access or a write access. In addition, network interface 205 may include timers 324 for creating local timestamp information. Timers 324 also may be used to determine timeout information. For example, if enough time expires between injection of a first memory request and injection of a subsequent memory request, the likelihood of a conflict between these memory requests is reduced and the efficiency estimate of the second request is greater than if those memory requests are issued closer together in time. Other embodiments of network interface 205 include different or additional storage elements containing information used by logic 310 to estimate memory request efficiency and to make memory request injection decisions for the corresponding node.

Still referring to FIGS. 4 and 5, in at least one embodiment of network interface 205, logic 310 compares target addresses of multiple memory requests in source memory request queue 307, and if any of the target addresses fall within the same 512-byte aligned address region, then logic 310 predicts that these memory requests will result in row-buffer hits in memory system 139 and increases the efficiency estimates for the memory requests. Logic 310 then treats those requests as efficient. Such an implementation may still be somewhat conservative. For example, memory 140 may include memory banks having row sizes in the range of several kilobytes, and if the interleaving is such that more than 512 bytes of contiguous data are mapped to the same memory bank, then addresses at distances greater than 512 bytes might still be scheduled in an efficient manner at the memory. In at least one embodiment of network interface 205, logic 310 receives some (or all) of the memory configuration information from the BIOS or other suitable technique. The information may include one or more of the interleaving algorithm/mapping, the number of channels, ranks, banks, sizes of memory, and or other memory configuration information. By incorporating this information into network interface 205, logic 310 may more accurately estimate memory request efficiency (e.g., whether or not the memory requests are likely to result in row buffer hits). For example, if it is known that bank interleaving occurs on a 2,048-byte granularity, then requests that are within the same 2 KB aligned block are considered to be efficient (as compared to a default 512-byte criteria) and decreases an associated efficiency estimate.

In at least one embodiment, logic 310 compares the addresses of pending requests to each other to determine their efficiencies. However, in an exemplary memory access pattern, two requests that would result in row buffer hits arrive at the network injection point at different times. When the first memory request arrives, there is no other request to the same address range in the source memory request queue 307, so logic 310 classifies the memory request as inefficient. The first memory request may then be injected into the network. Soon after, the second memory request arrives to source memory request queue 307. The second memory request has a target address in the same address range as the first request, but the second address cannot be compared to the first memory request, because the first request has already been injected into the network and is no longer residing in source memory request queue 307 where it could be compared.

In at least one embodiment of the network interface 205, recent memory access address registers 318 store the addresses of recent requests that were injected into the network and recent memory access timestamp registers 320 store corresponding timestamp or expiration counter information for when the most recent injection to that address (or address range) occurred. Logic 310 compares the addresses of any pending requests against the addresses of these recently injected requests. If the new requests are injected into the network before a certain amount of time has elapsed (or similarly, before the expiration counter reaches zero), then the efficiency-determination logic classifies this request as efficient (e.g., likely to result in a row buffer hit) and increases an associated memory request efficiency estimate. The time-out or expiration delay may be initialized and updated dynamically or may be set statically. In at least one embodiment, network interface 205 limits how many requests targeting the same address range may be classified as efficient. That restriction may be based on whether memory system 139 implements a scheduling algorithm that limits how many consecutive row-buffer-hitting memory requests may be serviced for fairness reasons.

A conventional injection policy aims to limit the impact of contention between memory requests by allowing no more than a predetermined number of memory requests to be injected into the network per unit of time. In a conservative setting, the predetermined number is chosen assuming that all requests result in row buffer misses and would therefore occupy memory controller buffers for a longer amount of time. In at least one embodiment, network interface 205 uses efficiency estimates to control the injection rate of memory requests into the network. Logic 310 uses a predetermined ratio and may update that ratio, to implement a particular injection policy. For example, logic 310 may use an injection policy and ratio that counts only the first memory request among a group of efficient memory requests (as determined by an embodiment of the mechanism described for the first part of the invention) toward a predetermined injection rate limit, and all subsequent requests do not count toward the predetermined injection rate limit or count only fractionally towards the injection rate. However, each request determined to be nominally efficient or inefficient continues to count toward the injection rate and may have a different weight than any efficient request. The weighted count handles a scenario having an initial request requiring a costly row activation in a destination memory bank, but subsequent requests hit in a row opened by the initial request are activation-latency free (i.e., not counted toward the injection rate) because they do not require any row activation. In at least one embodiment of network interface 205, those memory requests estimated to be efficient (i.e., efficient memory requests) do not count as free toward the injection rate, but instead count toward the injection rate at a discounted (e.g., fractional) rate. Each memory request estimated to be nominally efficient, as well as the first request among a group of requests otherwise estimated to be efficient, may count as one request toward the injection rate. However, subsequent efficient requests may have a fractional cost, k, toward the injection rate, where $0 \leq k < 1$. In addition, the injection rate indicator may be incremented by different values and/or the fractional cost k may vary according to the request type, (e.g., read or write). For example, a first amount may be used for memory requests estimated to be nominally efficient or a first memory request of a group of memory requests estimated to be efficient, a second amount may be used for other memory requests of the group of memory requests estimated to be efficient, and a third amount for memory requests estimated to be inefficient. Note that scaled arithmetic may be used to avoid having to explicitly implement floating-point operations for counting toward the injection rate.

In at least one embodiment, network interface 205 dynamically adjusts the value of the costs (e.g., the amount by which the injection rate indicator is changed) for injection of memory requests having different efficiency estimates. For example, if the amount of time since the last injected request from a group of efficient requests is somewhat high, but less than an expiration period, the likelihood that the current request arrives at memory controller 130 in time to be scheduled efficiently may decrease. In such an embodiment, a cost of a next memory request may be increased as a function of the elapsed time.

In at least one embodiment of network interface 205, the value of k may be increased as a function of a current network traffic, which may be observed by node 107 locally or observed globally based on information provided from other nodes 107. The current network traffic may be used by network interface similarly. For example, network interface 205 may increase the fractional cost with increased load because in a heavily-loaded network, the latencies for two (or more) packets to traverse the network tend to increase in variance, thereby reducing the probability that they will arrive sufficiently close in time for efficient scheduling, and therefore reducing their estimated efficiency.

In at least one embodiment, memory system 139 includes multiple types of memory. Memory system 139 may include conventional off-chip DRAM, faster, on-chip DRAM and/or includes a mix of memory technologies such as DRAM, SRAM, phase-change memory, memristors, or other memory type. Accordingly, logic 310 may use different criteria for determining efficiency estimates and injection rate indicators based on the type of memory targeted by a particular memory request.

In at least one embodiment of network interface 205, a single injection rate limit 328 may be applied to a memory system including multiple parallel memory units. In at least one embodiment of network interface 205, a separate injection rate limit may be applied to each memory channel of a memory system including multiple parallel units. While the overall memory system may support a particular number of requests per unit time, that specification may be based on a requirement that each of multiple memory channels receive a predetermined fraction of the particular number of memory requests. In this situation, rather than maintaining a single injection rate limit of that number, network interface 205 may maintain multiple separate limits corresponding to respective channels of a multi-channel memory system. Accordingly, network interface 205 will include separate storage elements for each memory channel and logic 310 will estimate memory request efficiency and base the injection rate for each memory channel on corresponding information. Note that in embodiments of network interface 205 that support those multiple injection rate limits, logic 310 determines or estimates whether multiple separate requests target the same memory channel, same memory node, or other locality information.

In at least one embodiment of network interface 205, logic 310 computes an actual efficiency based on information stored in storage 311. For example, in addition to recent memory access address and recent memory access time stamp information, logic 310 may store information related to response times associated with read memory accesses and determines an actual efficiency based on that information. In at least one embodiment, memory system 139 determines an actual memory request service rate for node 104 and communicates that information to node 104, which may base an actual efficiency rate on that information. Based on the actual efficiency information, logic 310 may update the memory request injection rate and/or any fractional costs used by logic 310.

Figure 6:
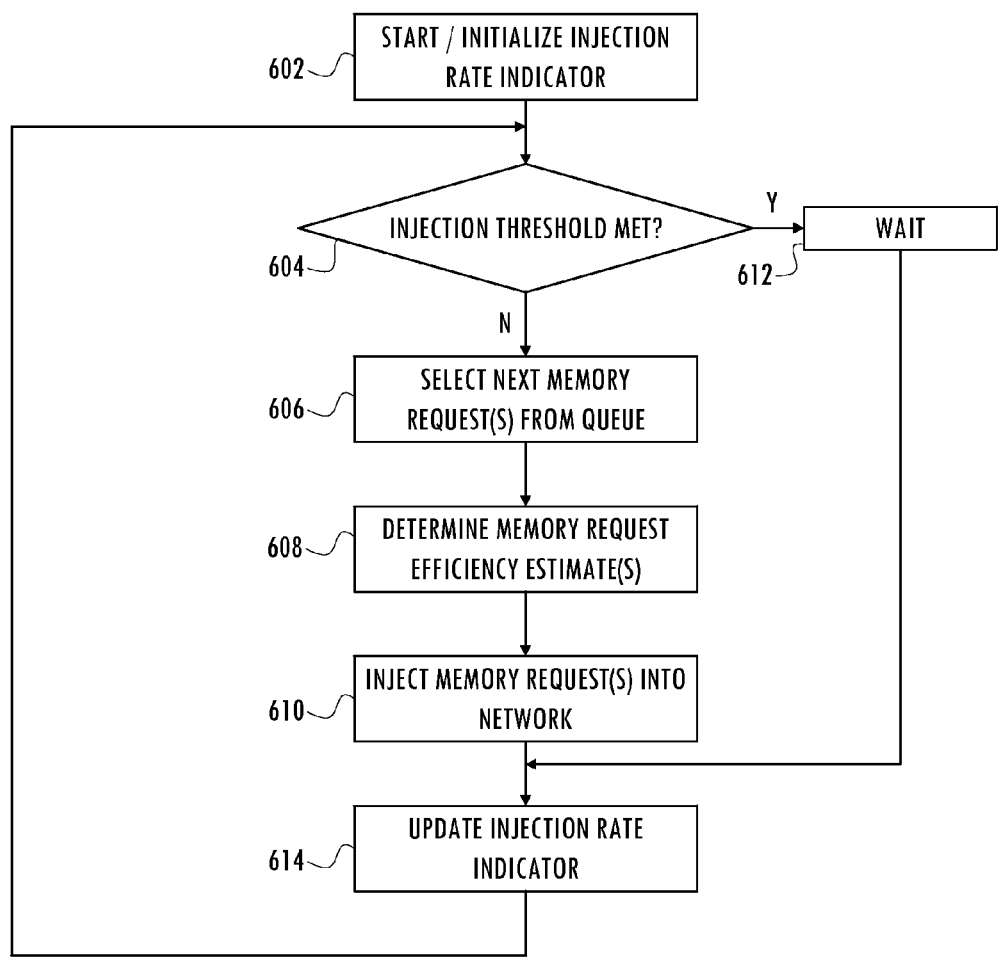
FIG. 6 illustrates information and control flows for the network interface of FIG. 5, consistent with at least one embodiment of the invention.

Referring to FIGS. 4, 5, and 6, an exemplary source node (shaded node 104 of FIG. 4) injects memory requests into a network to a target node, memory system 139, (shaded in FIG. 4). Exemplary logic 310 establishes an injection policy by initializing a memory request injection rate indicator based on suitable configuration information for the associated source node (602) before processing any memory requests. The injection policy for the node may include a threshold indicating a maximum number of memory requests injected by the node per period of time, may include multiple thresholds, each indicating a corresponding maximum number of memory requests injected by the node per period of time for each of several request types (e.g., reads, writes, speculative reads, etc.), each of several target memory nodes, and/or each target channel for each target memory node. In operation, logic 310 compares a metric, a memory request injection rate indicator, to a predetermined injection threshold value (e.g., a threshold value stored in bandwidth allocation register 316) (604). If the predetermined injection threshold value has been met by the memory request injection rate, then network interface 310 waits for a predetermined amount of time (612) and then updates the memory request injection rate indicator (602) until the memory request injection rate falls below the predetermined injection threshold value. The wait state may be used to adjust the injection rate. For example, by increasing a wait before injecting next memory request into the network, the injection rate decreases. If the memory request injection rate is below the predetermined injection threshold, then network interface 310 selects one or more next memory requests from the source memory request queue 307 (606). Then, network interface 310 estimates efficiencies of the one or more next memory requests. Network interface 310 injects the one or more memory requests into the network (610) and updates the memory request injection rate indicator based on the efficiency estimates for the one or more injected memory requests (614). Note that this information and control flow is exemplary only and other information and control flows for source-side memory request injection into a network may be used. For example, in other embodiments, logic 310 estimates the memory request efficiency estimates prior to evaluating whether or not the injection threshold has been met.

In at least one embodiment, logic 310 may use an indication of the efficiency estimates to adjust a number of speculative memory requests generated by node 107. For example, when the source memory request queue 307 includes speculative memory requests, logic 310 may compare a corresponding injection rate indicator to an injection rate threshold value. In at least one embodiment, the injection rate threshold is based on a bandwidth allocated to the node and a bandwidth of the port of the node. Based on that comparison, logic 310 may determine that speculative requests result in inefficient use of the memory bandwidth and logic 310 will reduce the number of speculative requests. Similarly, based on that comparison, logic 310 may determine that speculative requests are an efficient use of the memory bandwidth and logic 310 may increase the number of speculative requests. In addition, when the source memory request queue 307 does not include any speculative memory requests, logic 310 may compare corresponding injection rate indicator to an injection rate threshold value. Based on that comparison, logic 310 may determine whether or not to make any speculative memory requests.

Thus techniques for source-side memory request network admission control that may improve memory service efficiency to a network of nodes has been described. Structures described herein may be implemented using software executing on a processor (which includes firmware) or by a combination of software and hardware. Software, as described herein, may be encoded in at least one tangible computer readable medium. As referred to herein, a tangible computer-readable medium includes at least a disk, tape, or other magnetic, optical, or electronic storage medium.

While circuits and physical structures have been generally presumed in describing embodiments of the invention, it is well recognized that in modern semiconductor design and fabrication, physical structures and circuits may be embodied in computer-readable descriptive form suitable for use in subsequent design, simulation, test or fabrication stages. Structures and functionality presented as discrete components in the exemplary configurations may be implemented as a combined structure or component. Various embodiments of the invention are contemplated to include circuits, systems of circuits, related methods, and tangible computer-readable medium having encodings thereon (e.g., VHSIC Hardware Description Language (VHDL), Verilog, GDSII data, Electronic Design Interchange Format (EDIF), and/or Gerber file) of such circuits, systems, and methods, all as described herein, and as defined in the appended claims. In addition, the computer-readable media may store instructions as well as data that can be used to implement the invention. The instructions/data may be related to hardware, software, firmware or combinations thereof.

The description of the invention set forth herein is illustrative, and is not intended to limit the scope of the invention as set forth in the following claims. For example, while the invention has been described in an embodiment in which a network on a chip is described, one of skill in the art will appreciate that the teachings herein can be utilized with other network types including multiple integrated circuits. In addition, while the invention has been described in embodiments in which a source node injects memory requests into a network and network interface uses memory request injection rate indicator metrics, one of skill in the art will appreciate that the teachings herein can be utilized with other request types (e.g., I/O requests, coprocessor requests, etc.) and associated metrics. Variations and modifications of the embodiments disclosed herein, may be made based on the description set forth herein, without departing from the scope and spirit of the invention as set forth in the following claims.

What is claimed is:

1. A method comprising:
    adjusting, by a first node, a rate of injection of memory requests by the first node into a network coupled to a memory system, the adjusting being based on an injection policy for the first node and memory request efficiency indicators,
    wherein the adjusting includes determining a metric for memory requests injected into the network by the first node and comparing the metric to an injection rate limit for the first node, the metric being increased by a first amount for a first memory request of a plurality of efficient memory requests injected into the network, increased by a second amount less than the first amount for each other memory request of the plurality of efficient memory requests injected into the network, and increased by a third amount for each memory request of a plurality of inefficient memory requests injected into the network.

2. The method, as recited in claim 1, further comprising:
    determining an efficiency estimate of a memory request based on comparison of a request type of the memory request to a request type of a recent memory request of the first node,
    wherein the efficiency estimate indicates a likelihood of the memory request resulting in a hit in a row buffer of the memory system.

3. The method, as recited in claim 2, wherein the efficiency estimate is further based on comparisons of time stamps associated with a recent memory request of the first node to a current time.

4. The method, as recited in claim 1, further comprising:
    dynamically adjusting the first amount, the second amount, or the third amount according to an actual efficiency indicator for the plurality of efficient memory requests or an actual efficiency indicator for the plurality of inefficient memory requests.

5. The method, as recited in claim 1, wherein the rate of injection is based on a bandwidth allocation indicator indicating a relationship between bandwidth of a port of the first node and a bandwidth of a channel of the memory system.

6. The method, as recited in claim 1, wherein the injection policy for the first node is based on a configuration of the memory system.

7. The method, as recited in claim 1, wherein the injection policy is based on an injection rate limit for the first node.

8. The method, as recited in claim 1, wherein the injection policy for the first node is based on an injection rate limit per memory channel for the first node.

9. The method, as recited in claim 1, further comprising:
    determining each of the memory request efficiency indicators based on comparison of a target address of a corresponding memory request to a target address of a recent memory request of the first node,
    wherein each of the memory request efficiency indicators indicates a likelihood of a corresponding memory request resulting in a hit in a row buffer of the memory system.

10. An apparatus comprising:
    a node comprising:
        a processor; and
        a network interface configured to:
            inject memory requests into a network at an injection rate; and
            adjust the injection rate according to an injection policy for the node and an injection rate indicator,
    wherein the injection rate is adjusted by determining a metric for memory requests injected into the network by the node and comparing the metric to an injection rate limit for the node, the metric being increased by a first amount for a first memory request of a plurality of efficient memory requests injected into the network, increased by a second amount less than the first amount for each other memory request of the plurality of efficient memory requests injected into the network, and increased by a third amount for each memory request of a plurality of inefficient memory requests injected into the network.

11. The apparatus, as recited in claim 10, wherein the network interface comprises:
    network interface logic; and
    a first plurality of storage elements configured to store target addresses of recently-injected memory requests recently injected into the network by the node, the network interface logic being configured to adjust the injection rate indicator based on comparisons of target addresses of the memory requests to target addresses stored in the first plurality of storage elements, wherein an efficiency estimate indicates a likelihood of the first memory request resulting in a hit in a row buffer of a memory system coupled to the network.

12. The apparatus, as recited in claim 11, wherein the network interface further comprises a second plurality of storage elements configured to store timestamp information corresponding to the recently-injected memory requests, wherein the network interface logic is further configured to adjust the injection rate indicator based on comparisons of a current time indicator to timestamp information stored in the second plurality of storage elements.

13. The apparatus, as recited in claim 11, wherein the network interface logic further comprises a second plurality of storage elements configured to store an indicator of memory access type corresponding to the recently-injected memory requests, wherein the network interface logic is further configured to adjust the injection rate indicator based on comparisons of access type indicators to memory access type information stored in the second plurality of storage elements.

14. The apparatus, as recited in claim 11, wherein the network interface logic further comprises a bandwidth allocation indicator indicating a relationship between bandwidth of a port of the node and a bandwidth of a channel of a memory system shared by the node with other nodes of the network, wherein the network interface logic is further configured to adjust the injection rate based on the bandwidth allocation indicator.

15. The apparatus, as recited in claim 11, wherein the network interface logic further comprises a memory configuration indicator of a configuration of a memory system shared by the node with other nodes of the network, wherein the network interface logic is further configured to adjust the injection rate indicator based on the memory configuration indicator.

* * * * *